June 29, 1971     W. T. GRUBB ET AL     3,589,943
ELECTROCHEMICAL BATTERY
Filed Aug. 29, 1968
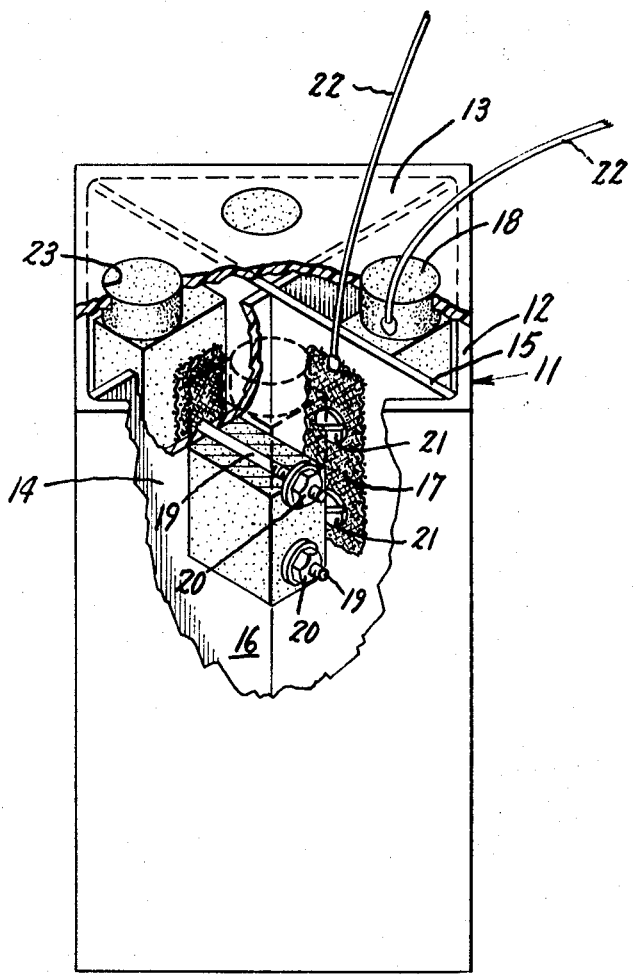
Inventors:
Willard T. Grubb,
Herman A. Liebhafsky,
by Paul R. Webb, II
Their Attorney.

United States Patent Office

3,589,943
Patented June 29, 1971

---

3,589,943
ELECTROCHEMICAL BATTERY
Willard T. Grubb, Schenectady, N.Y., and Herman A. Liebhafsky, Bryan, Tex., assignors to General Electric Company
Filed Aug. 29, 1968, Ser. No. 756,143
Int. Cl. H01m 27/02
U.S. Cl. 136—86                               5 Claims

ABSTRACT OF THE DISCLOSURE

An electrochemical battery has a plurality of individual, fluid-tight fuel-electrolyte chambers in each of which an anode and a gas diffusion cathode mounted therein are connected electrically to the respective gas diffusion cathode and anode of adjacent cells. The electrolyte containing dissolved fuel in each cell is separated from adjacent cells thereby eliminating load paths across cells. Such a battery provides a high voltage output from a compact device.

---

This invention relates to electrochemical batteries and, more particularly, to such electrochemical batteries which include a plurality of individual fuel-air cells connected electrically in series forming a compact device.

An electrochemical cell, when employed as a fuel-air cell has an electrolytic solution of aqueous alkaline-electrolyte with a soluble fuel dissolved therein, contains an anode in contact with the electrolytic solution that is capable of electrocatalytically oxidizing a fuel, such as an alcohol, and contains a cathode of porous, gas diffusion material which forms a gas permeable but leak resistant barrier between the electrolyte and the oxidant, usually air. The cathode is provided with a surface which is active for the reduction of the oxidant but is passive to the alcohol or other fuel.

It would be desirable to provide a battery employing the advantages of a fuel-air cell including a higher voltage output but eliminating the problem of shorting across the series connected array of anodes and cathodes by the electrolyte.

Our present invention is directed to a unique electrochemical battery of this kind.

It is a primary object of our invention to provide an improved, compact electrochemical fuel-air battery with a high voltage output.

In accordance with one aspect of our invention, an electrochemical battery has a container, a plurality of electrically insulating partitions in the container forming a plurality of adjacent chambers, and an electrolytic solution of an aqueous alkaline solution with a dissolved fuel in each chamber. A gas diffusion cathode and a fuel anode are mounted within each chamber in contact with the electrolytic solution and spaced apart. Each anode is connected electrically to a cathode in an adjacent chamber. A terminal anode and a terminal cathode are each connected to separate electrical leads.

These and various other objects, features and advantages of the invention will be better understood from the following description taken in connection with the accompanying drawing in which:

The single figure is a perspective view partially in section of an electrochemical battery embodying our invention.

In the single figure of the invention, there is shown generally at 10 an electrochemical battery embodying our invention. Battery 10 has a casing 11 which comprises a body portion 12 with a closed bottom and an open top and a cover portion 13 which fits tightly over the open top of body portion 12. Casing 11 defines a chamber 14 into which a plurality of electrically insulating partitions 15 are positioned to form a plurality of adjacent chambers 16.

A fuel anode 17 and a gas diffusion cathode 18 are mounted in each chamber 16 and spaced apart. When each chamber is filled with an electrolytic solution of an aqueous alkaline solution with a dissolved fuel, both anode and cathode electrodes will be in contact therewith. While various suitable arrangements can be employed to mount or support the electrodes in each chamber, we prefer to accomplish this mounting by positioning anode 17 on one surface of each partition 15 and by positioning a cathode 18 on the opposite surface of each partition 15. Prior to assembly a pair of holes are drilled through each partition, anode and cathode for subsequent mounting. The pair of electrically conducting fasteners, such as screws 19, are fitted through three anodes, partitions and cathodes. Each of the three pair of screws 19 is held in place by electrically conducting nuts 20. In this manner, series electrical connection is made between an anode in one chamber and a cathode in an adjacent chamber. The fourth anode and cathode, the terminal electrodes are mounted in a similar manner by a pair of electrically insulating fasteners, such as screws 21, and electrically insulating nuts (not shown). An electrical lead 22 is connected to each of the terminal electrodes. Cover portion 13 has an aperture 23 into which the upper end of each cathode 18 fits whereby the portion of the cathode is exposed to the atmosphere or a gaseous medium.

We found unexpectedly that a unique electrochemical battery could be formed which has the advantages of fuel-air cells and produces a higher voltage output than a single fuel-air cell but eliminates the prior art problem of shorting the electrodes by the electrolyte through a load path across the cells. Such a battery is provided by a container which has a plurality of electrically insulating partitions forming a plurality of adjacent fluid-tight chambers. We found that a gas diffusion cathode and an anode can be mounted and spaced apart within each chamber and connected electrically to the opposite electrode in an adjacent chamber. Preferably, a cathode and an anode are mounted on opposite sides of each electrically insulating partition and connected electrically by an electrically conducting screw therethrough. In this manner, each partition provides both electrical insulation between adjacent chambers and a support for mounting the electrodes. The screws provide both electrical connections and fastening structure. The terminal anode and cathode are mounted in a similar manner by an electrically insulating screw. The electrolytic solution is contained in each fluid-tight chamber. A cover is preferably provided for the battery. The gas diffusion cathodes have a surface extending through the cover thereby providing contact with the atmosphere. Our battery is shown in the single figure of the drawing with four compartments in a square configuration as viewed from the top. However, various configurations, including a linear arrangement and varying number of compartments can be employed. In any configuration, it is important that each chamber or compartment be fluid-tight.

Anode 17 is schematically illustrated in the drawing. It may be of any conventional construction or configuration. Anodes capable of efficiently oxidizing a fuel such as alcohol usually include platinum metals, their alloys or mixtures as the electrocatalysts. Alloys or mixtures of platinum with ruthenium or palladium are generally considered most efficient. The electrocatalyst may be employed as a high area coating on a substrate, suitably bonded into a porous mass or supported on a porous substrate of nickel, carbon, etc.

Porous cathode electrode 18 is formed of a porous electronically conductive mass which, at least at the point where the conductive mass forms an interface with the electrolyte, includes an electrocatalytically active material. The electrocatalyst is catalytically active toward the reduction of oxidant but is catalytically passive toward the oxidation of the fuel. A preferred suitable material meeting all of the above criteria is a porous carbon mass. This material is recognized to selectively catalyze the reduction of oxygen while remaining passive toward a fuel, such as alcohol. Other catalysts are, of course, known which are selective to the reduction of oxygen. Spinels and silver are such materials. Although the cathode may be constructed without the addition of wet-proofing materials, in the preferred form wet-proofing material is distributed throughout the conductive mass.

Cathode 18 can be covered with an impervious mask except in a portion facing the spaced apart anode. The mask may be formed of any material which is impervious to oxidant as well as fuel and electrolyte. Specific examples of masking materials include impervious metal coatings as well as coatings of alkali and methanol impervious non-metals, such as waxes, rubbers, and resins. The mask is preferably applied in the form of an adhesive coating. Wax has been found to be an easily applied, low cost masking material of suitable stability. Cathodes of the above configuration which are both masked and wet-proofed perform better than corresponding electrodes lacking either masking, wet-proofing, or both.

The preferred electrolyte and fuel for use as the electrolytic solution is a mixture of an aqueous alkaline electrolyte and alcohol which is confined in each chamber 16. As is well understood in the art, the electrolyte may be aqueous alkaline solution of any desired concentration. While the alkali metal hydroxides are the most commonly employed and of the lowest cost, it is appreciated that other soluble hydroxides may be employed, such as tetra-substituted ammonium or phosphonium hydroxides. As used herein the term "alcohol" includes methanol, ethanol, n-propanol, and isopropanol—that is, any alcohol having from 1 to 3 carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in a molar ratio that insures that all the alcohol will be consumed during extended operation of the unit. Other fuels are also suitable such as hydrazine, formate, ammonia, ethylene glycol, etc.

In an illustrative operation of the battery shown in the single figure of the drawing, an electrolytic solution containing both an electrolyte of 13 M potassium hydroxide and a fuel of 6 M methyl alcohol was poured into each chamber 16 of body portion 12. Cover portion 13 was fitted frictionally at the upper open end of body portion 12 whereby the upper surface of each of the four cathodes was exposed to the atmosphere. Leads 22 were connected to a suitable electrical load (not shown) and electrical energy was generated from the cell. When the fuel in the form of methyl alcohol was depleted, cover 13 was removed, the electrolytic solution in each chamber 16 removed, and the electrolytic solution replaced. The cell was thus recovered and operated.

An example of an electrochemical battery made in accordance with our invention is set forth below in Example 1. An example of an electrochemical battery, which does not have fluid-tight partitions is set forth below in Example 2.

EXAMPLE 1

In this example, an electrochemical battery was assembled as shown in the single figure of the drawing. Paraffin wax was used to seal the bottom and edges of the partitions to the interior of the container thereby providing fluid-tight partitions. Each of the four cathodes was porous carbon wet-proofed with polyethylene and masked with ceresine wax except for a portion of each which was opposite its anode or exposed to air. Each anode with an active area of 3.23 cm.$^2$ had a porous nickel substrate activated with platinum black at a loading of 1.8 mg./cm.$^2$ and a palladium black loading of 0.8 mg./cm.$^2$. The electrolytic solution, which filled each of the four chambers was an aqueous solution of 6 M methanol and 13 M potassium hydroxide.

The voltage on open circuit of each cell was tested and is shown below in Table I. The cell or partition, which has the terminal anode, is designated Cell 1 and the other cells are numbered clockwise.

TABLE I

| Cell No.: | Voltage |
|---|---|
| 1 | 0.791 |
| 2 | 0.859 |
| 3 | 0.736 |
| 4 | 0.775 |

This battery was operated and tested under load by a standard procedure of placing a known load resistance across it and reading voltage and current after 10 minutes at each load. The voltage versus current for this operation is shown below in Table II.

TABLE II

| Current (ma.): | Battery voltage (volts) |
|---|---|
| 0.0 | 3.16 |
| 0.64 | 2.56 |
| 1.17 | 2.34 |
| 2.02 | 2.02 |
| 3.40 | 1.70 |
| 5.80 | 1.17 |
| 8.00 | 0.80 |
| 10.2 | 0.51 |
| 12.2 | 0.25 |

EXAMPLE 2

In this example, an electrochemical battery was assembled as described above in Example 1. However, the paraffin wax was used to seal the partition to the interior of the container except between one edge of the partition and the interior wall of the container. This unsealed edge was between cells or partitions 2 and 3 as described above in Example 1.

The open-circuit voltage, and the current and voltage under load, were measured as described above in Example 1 and are set forth below in Tables III and IV, respectively.

TABLE III

| Cell No.: | Voltage |
|---|---|
| 1 | 0.637 |
| 2 | 0.518 |
| 3 | 0.516 |
| 4 | 0.735 |

TABLE IV

| Current (ma.): | Battery voltage (volts) |
|---|---|
| 0.0 | 2.44 |
| 0.505 | 2.02 |
| 0.925 | 1.85 |
| 1.62 | 1.62 |
| 2.60 | 1.30 |
| 4.30 | 0.86 |
| 5.65 | 0.56 |
| 6.90 | 0.35 |

It will be seen from the above Tables I–IV the substantial improved performance of the battery of Example 1 which was made in accordance with our invention. While the battery of Example 2 was made in a similar manner, electrolyte was allowed to leak between cells 2 and 3 which resulted in the problem of a load path across these cells.

The following Example 3 shows the further operation of the battery of Example 1 which was made in accordance with our invention.

EXAMPLE 3

A cover of a fluoroethylene-propylene polymer was employed for the battery of Example 1. The four cathodes were exposed through the cover to the atmosphere. The battery was placed on a 1,000 ohm load resistance. The temperature was about 25° C. throughout the test. The current readings are set forth below in Table V with the time listed in hours from the start of the life test.

TABLE V

| Time (hours): | Current (ma.) |
|---|---|
| 0 | 2.25 |
| 18.5 | 2.25 |
| 41.3 | 2.22 |
| 67.0 | 2.20 |
| 112.6 | 2.20 |
| 138.7 | 2.20 |
| 163.1 | 2.20 |
| 184.6 | 2.20 |
| 209.0 | 2.20 |
| 308.0 | 2.20 |
| 335.0 | 2.20 |
| 358.5 | 2.18 |
| 451.1 | 2.10 |

While other modifications of the invention and variations thereof which may be employed within the scope of the invention have not been described, the invention is intended to include such as may be embraced within the following claims.

What we claim as new and desire to secure by Letters Patent of the United States is:

1. An electrochemical battery comprising a container, a plurality of fluid-tight, electrically insulating partitions in the container forming a plurality of adjacent chambers, a gas diffusion cathode positioned on a partition within each chamber, a fuel anode positioned on the associated partition within each chamber and spaced from its associated cathode, means for electrically connecting each anode to a cathode in an adjacent chamber, a terminal cathode, a terminal anode, an electrical lead connected to the terminal cathode, and a second electrical lead connected to the terminal anode.

2. In an electrochemical battery as in claim 1, wherein said means for electrically connecting the anode and the cathode is an electrically conductive fastener extending through the partition mounting the cathode and anode and providing electrical connection therebetween.

3. In an electrochemical battery as in claim 1, wherein a liquid impervious cover is positioned on the upper open end of the container, and each of the cathode electrodes has a surface extending through the cover.

4. In an electrochemical battery as in claim 1, wherein an electrolytic solution of an alkaline electrolyte and a dissolved fuel are contained in each of the adjacent chambers.

5. In an electrochemical battery as in claim 4, wherein the dissolved fuel is methanol.

References Cited

UNITED STATES PATENTS

| 1,712,897 | 5/1929 | Morrison | 136—134 |
| 2,925,454 | 2/1960 | Justi et al. | 136—86 |

FOREIGN PATENTS

| 6,709,333 | 1/1968 | Netherlands | 136—86 |

ALLEN B. CURTIS, Primary Examiner

U.S. Cl. X.R.

136—134